US012647262B2

(12) United States Patent
Boutan et al.

(10) Patent No.: US 12,647,262 B2
(45) Date of Patent: Jun. 2, 2026

(54) REDUNDANT QUANTUM RANDOM NUMBER GENERATOR IN A QUANTUM COMMUNICATION SYSTEM

(71) Applicant: Quantum Technologies Laboratories, Inc., New York, NY (US)

(72) Inventors: Peter Boutan, North Bay Village, FL (US); Kyle Kroskey, Chesapeake, VA (US); David Johns, Dayton, NV (US); Alain Obadia, New York, NY (US)

(73) Assignee: Quantum Technologies Laboratories, Inc., New York, NY (US)

( * ) Notice: Subject to any disclaimer, the term of this patent is extended or adjusted under 35 U.S.C. 154(b) by 160 days.

(21) Appl. No.: 18/452,393

(22) Filed: Aug. 18, 2023

(65) Prior Publication Data

US 2025/0007704 A1     Jan. 2, 2025

Related U.S. Application Data

(60) Provisional application No. 63/399,011, filed on Aug. 18, 2022.

(51) Int. Cl.
*H04L 9/08* (2006.01)
*G06F 7/58* (2006.01)

(52) U.S. Cl.
CPC ............ *H04L 9/0869* (2013.01); *G06F 7/588* (2013.01); *H04L 2209/08* (2013.01)

(58) Field of Classification Search
CPC .... H04L 9/0869; H04L 9/0861; H04L 9/0852
See application file for complete search history.

(56) References Cited

U.S. PATENT DOCUMENTS

| | | | | | |
|---|---|---|---|---|---|
| 11,329,811 | B1* | 5/2022 | Russell | ................. | H04L 9/0866 |
| 2020/0403787 | A1* | 12/2020 | Islam | .................... | H04L 9/0852 |
| 2021/0083865 | A1* | 3/2021 | Obadia | ................. | H04L 9/0852 |
| 2025/0007704 | A1* | 1/2025 | Boutan | .................... | G06F 7/588 |

* cited by examiner

*Primary Examiner* — Ponnoreay Pich
(74) *Attorney, Agent, or Firm* — Crowell & Moring LLP

(57) ABSTRACT

The disclosed embodiments generally use multiple QRNGs contained within independent servers operating in a round-robin fashion via an Application Programming Interface (API) such that the quality of the random number bitstream can be enhanced due to a sum of entropy being gathered across multiple QRNGs that are multiplicative in nature. This allows for multiple modes of operation to be accomplished, the first being a higher overall random stream bitrate, the second being an enhanced entropy stream where output from the independent QRNGs are interleaved together to improve the quality of the random bitstream, and the third mode of operation where a minimum guaranteed random bitstream rate is maintained equal to the redundancy value chosen by the operator based upon the quantity of QRNG devices within the system.

20 Claims, 4 Drawing Sheets

REDUNDANT QUANTUM RANDOM NUMBER GENERATOR IN A QUANTUM COMMUNICATION SYSTEM

CROSS REFERENCE

This patent application is based on and claims the benefit of priority to U.S. Provisional Patent Application No. 63/399,011, filed on Aug. 18, 2022, entitled "Redundant Quantum Random Number Generator in a Quantum Communication System," which is herein incorporated by reference in its entirety.

TECHNICAL FIELD

This disclosure generally relates to quantum information processing, computation, quantum cryptography, and communication. It particularly concerns a mechanism for generation, delivery, and application of redundant Quantum Random Numbers (QRNs).

BACKGROUND

Randomly generated numbers are critical basis for key generation for secure communication systems. In particularly, availability of nearly ideal random numbers with high reliability, high bitrates, as well as secure delivery (e.g., via quantum key distribution) for quantum key generation constitutes one of a number of critical aspects for achieving practical quantum cryptography in these communication systems.

SUMMARY

The disclosure below generally relates to quantum information processing, computation, quantum cryptography, and communication. It particularly concerns a server-client architecture for generation, delivery, and application of redundant Quantum Random Numbers (QRNs). Such redundancy may effectively facilitate an enhancement of reliability of quantum random number generation, an increase of the random bitrate, and an improvement of entropy level (or idealness) of the quantum random numbers so generated. The device(s) disclosed herein for generating quantum random numbers in such a manner may be referred to as redundant Quantum Random Number Generator(s) (QRNG(s)).

The disclosed embodiments generally use multiple QRNGs contained within independent servers operating in a round-robin fashion via an Application Programming Interface (API) such that the quality of the random number bitstream can be enhanced due to a sum of entropy being gathered across multiple QRNGs that are multiplicative in nature. This allows for multiple modes of operation to be accomplished, the first being a higher overall random stream bitrate, the second being an enhanced entropy stream where output from the independent QRNGs are interleaved together to improve the quality of the random bitstream, and the third mode of operation where a minimum guaranteed random bitstream rate is maintained equal to the redundancy value chosen by the operator based upon the quantity of QRNG devices within the system.

In one example implementation, a quantum communication system is disclosed. The quantum communication system may include a plurality of quantum random number generators (QRNGs), configured to generate quantum random bitstreams; and a server configured as an endpoint to aggregate the plurality of QRNGs to provide a quantum random number generation service to a plurality of devices. The server may include an application programing interface (API) for the plurality of devices to request the quantum random number generation service.

In the example implementation above, the plurality of QRNGs may be configured to independently generate streams of quantum random bits, each of the quantum random bitstreams of each of the plurality of QRNGs may be used for generating one or more encryption keys for a communication session.

In any one of the example implementations above, the server may be configured to combine the quantum random bitstreams each from the plurality of quantum random number generators to generate an encryption key.

In any one of the example implementations above, the quantum random bitstreams of the plurality of quantum random number generators may be combined to achieve a bitrate requirement.

In any one of the example implementations above, the quantum random bitstreams of the plurality of quantum random number generators may be combined to achieve an entropy requirement.

In any one of the example implementations above, the quantum random bitstreams may be interleaved to form the combined quantum random bitstream.

In any one of the example implementations above, a minimum quantum random bitstream rate may be maintained at a predefined redundancy value based on quality of the plurality of QRNGs.

In any one of the example implementations above, the plurality of QRNGs may be centralized.

In any one of the example implementations above, the plurality of QRNGs may be geographically distributed.

In any one of the example implementations above, the server may be configured to provide the quantum random number generation service in at least two predefined modes.

In any one of the example implementations above, at least one of the plurality of QRNGs is based on random transmittance or reflectance of single photons at a semitransparent optical component.

In any one of the example implementations above, at least two of the plurality of the plurality of QRNGs are based on distinct types of entropy sources.

In some other example implementations, methods performed by a server corresponding to the above implementations are also disclosed.

DETAILED DESCRIPTION

Figure 1:
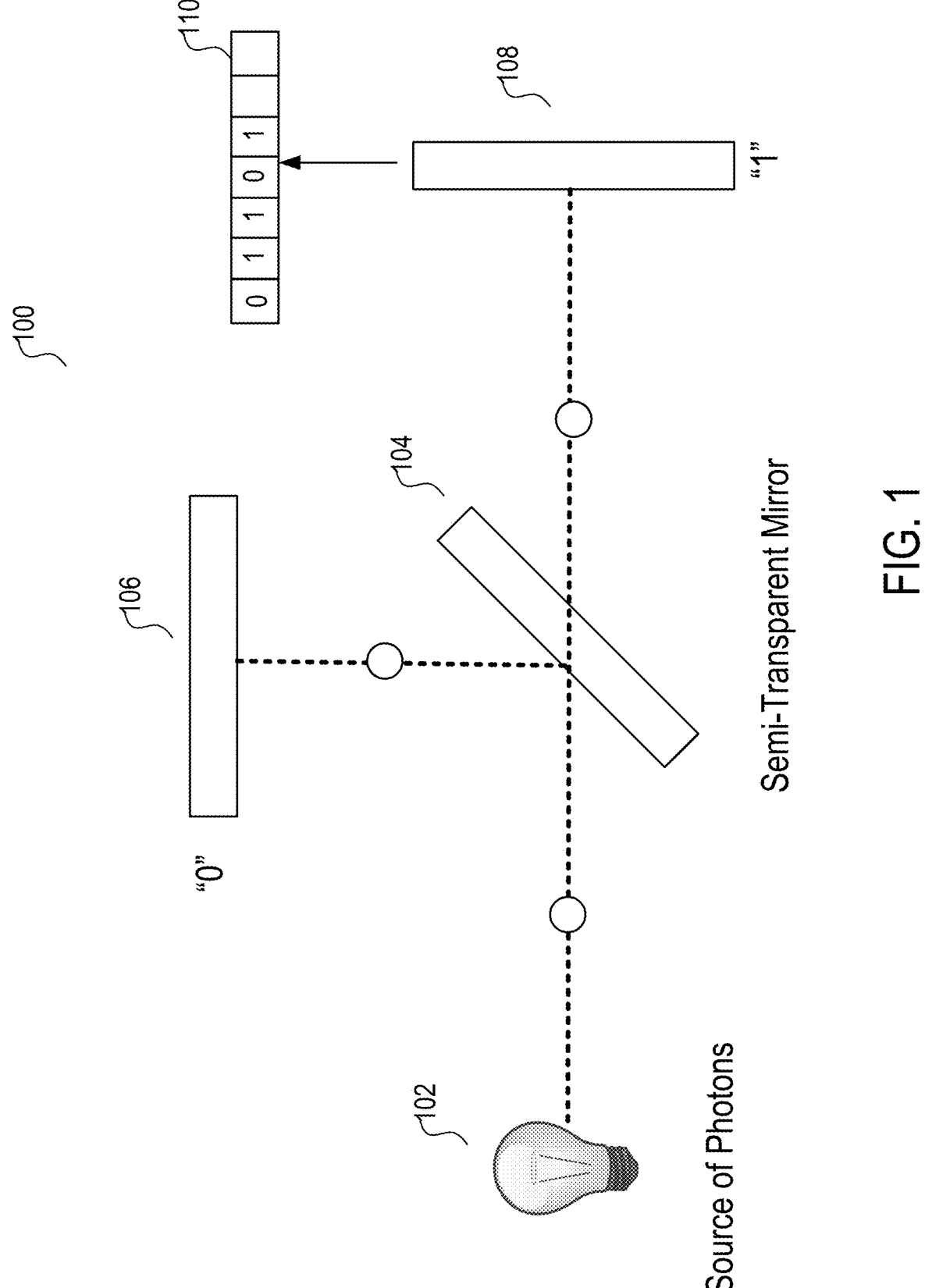
FIG. 1 is a diagram illustrating a quantum optical system for generating binary random numbers.

A system related to quantum information processing, quantum computing, quantum cryptography, and quantum communication will now be described in detail hereinafter with reference to the accompanied drawings, which form a part of the present disclosure, and which show, by way of illustration, various example implementations and embodiments. The system may, however, be embodied in a variety of different forms and, therefore, the disclosure herein is intended to be construed as not being limited to the embodiments set forth. Further, the disclosure may be embodied as methods, devices, components, systems, and/or platforms. Accordingly, embodiments of the disclosure may, for example, take the form of hardware, software, firmware or any combination thereof.

Throughout the specification and claims, terms may have nuanced meanings suggested or implied in context beyond an explicitly stated meaning. The phrase "in one embodiment/implementation" or "in some embodiments/implementations" as used herein does not necessarily refer to the same embodiment/implementation and the phrase "in another embodiment/implementation" or "in other embodiments" as used herein does not necessarily refer to a different embodiment. It is intended, for example, that claimed subject matter includes combinations of exemplary embodiments/implementations in whole or in part.

In general, terminology may be understood at least in part from usage in its context. For example, terms, such as "and", "or", or "and/or," as used herein may include a variety of meanings that may depend at least in part upon the context in which such terms are used. Typically, the term "or", if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

The disclosure below generally relates to quantum information processing, computation, quantum cryptography, and communication. It particularly concerns a mechanism for generation, delivery, and application of redundant Quantum Random Numbers (QRNs). Such redundancy effectively facilitates an enhancement in reliability of quantum random number generation, and an improvement in entropy level (or idealness) of quantum random numbers so generated. The device(s) disclosed herein for generating quantum random numbers in such a manner may be referred to as redundant Quantum Random Number Generator(s) (QRNG(s)).

By way of introduction, security of a data communication system critically depends on encryption of the data. Data are encrypted and consequently decrypted using keys. The keys are generated and transmitted (distributed) in and among various components of the communication system. Security of the entire encryption and decryption processes thus rely largely on the secrecy of the encryption keys. As such, key must be protected from being intercepted when they are being distributed or transmitted. Equally importantly, they must be generated in a manner that they cannot be easily guessed or derived even without them being intercepted.

With respect to the key generation aspect above, which will be the focus of this disclosure, a random key that is not easily guessable may be used for encrypting content in a communication network. Such a random key may be generated by the communication network based on a random number. Such a random number may be generated in a manner such that it is impossible or not easy to predict. A random number generator, for example, may rely on a physically random process or phenomenon for the generation of a random number rather than relying on mathematics or some pre-defined guessable algorithm. The physical process or phenomenon being relied on for such a random number generation may be referred to as an entropy source. It is desirable for the random number generator to be genuinely unpredictable even the system is known from the outside so that values output from the random number generator cannot be guessed. The physical process or phenomenon, for example, may has to do with random glitches in semiconductors or other random events. The goal of an entropy source is to generate random bits with high entropy. The term entropy may be used to generally represents an amount of disorder in a system. The higher the entropy, the more disordered the system is. In the context of random bits generation, the higher the entropy of the source, the more randomness in the output of the source.

In a practical application, typical physical processes may not be perfectly random. As such, output bits generated as-is via such physical processes may not be a uniformly distributed random numbers for direct use as cryptograph keys. Some techniques may be applied, for example, to remove bias from these output values. As a result, generation of truly random bits from these entropy sources may be at a very low bitrate, which may be insufficient for use as cryptographic keys in real-time.

In some example implementations, a random bit sequence generated from such physical processes at a low bitrate may be used as a seed value applied to a pseudorandom number generator for creating cryptographic keys. While such techniques may help keep up with real-time requirements of key generation that are practically hard to break based on low bitrate random bit sequence, the keys so generated nevertheless rely on pseudorandom rather than truly random numbers, and are thus potentially breakable.

Therefore, for the most critical applications that require ultimate security against advancing computational abilities of hackers, it may be desirable for the cryptographical keys to be based on truly random bits generated with sufficient bitrate in a direct manner rather than via any pseudorandom algorithms. In some example implementations, a quantum random number generator (QRNG) may be used for the generation of nearly perfect random bit sequences. In the various embodiments below, further implementations are disclosed for improving the entropy (or perfectness) of the random bits, and/or for enhancing the bitrate of the random bit sequences so generated.

A basic QRNG represents a new way of generating random numbers. In a QRNG, a random quantum mechanical process is used as an entropy source for the generation of random bit sequences with a high entropy and relatively high bitrate (without having to perform significant bias removal, for example) such that the pseudorandom seeding stage is not needed and the random bit sequences or streams from the QRNG may be directly used as cryptographic keys. A QRNG is not limited in use for cryptography key generation. For example, in situation unrelated to cryptography, a QRNG may be used for generating sequences of random bits for use in quantum simulations. Example QRNGs based on an optical system of photon number states are described in U.S. patent application Ser. No. 17/023,165 filed on Sep.

16, 2020 by the same Applicant. The content of this prior patent application is herein incorporated by reference in its entirety.

For example, FIG. 1 shows a diagram illustrating such an optical system 100 used to generate binary, purely random numbers (bit rate of, for example, 16 Mb/sec). A quantum light source 102 may be used in the optical system 100. From a quantum physics point of view, light consists of elementary "particles" referred to as photons. Photons exhibit in certain situations a random behavior. One such situation for photons, which is very well suited to the generation of binary random numbers, is their transmission at a semi-transparent mirror 104. Whether a photon incident on such an optical component be reflected or transmitted is intrinsically random and cannot be influenced by any external parameters.

The photons in the optical system 100 described in FIG. 1 as output by the photon source 102 may be in a superposition (linear combination) of states (transmission or reflection) until they are measured, when they jump entirely into one of the two states. The detection of the output photons from the semi-transparent mirror may be performed either at the reflection port 106 or the transmission port 108. For example, the detection of an output of a sequence of input photons may represent a truly random binary bit sequence as shown by 110.

Figure 2:
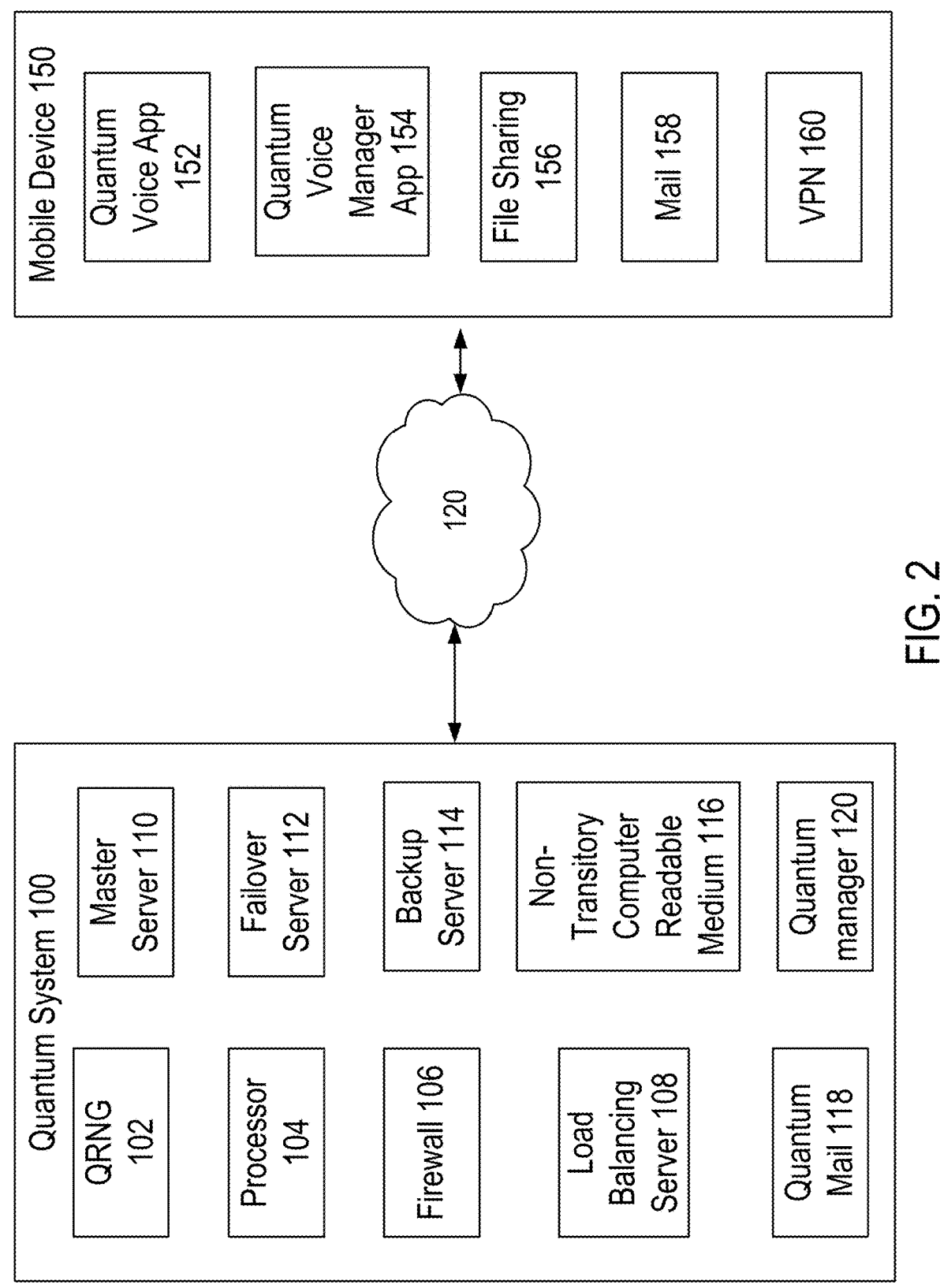
FIG. 2 illustrates an example quantum system according to one aspect of this disclosure.

FIG. 2 shows an example server-client environment 200 that may implement certain aspects of the present disclosure for providing data communications utilizing quantum phenomena. The components and arrangements shown in FIG. 2 are not intended to limit the disclosed embodiments as the components used to implement the disclosed processes and features may vary. As shown in FIG. 2, a quantum system 202 may include a collection of servers for providing a seamless backend data service for users or user devices. A quantum system 201 may be used to send and receive messages, and may serve as the initial routing point for voice communications.

As shown in FIG. 2, in some implementations, the quantum system 201 may include one or more of the following: a quantum random number generator (QRNG) 202, a processor 204, a firewall 206, a load balancing server 208, a master server 210, a failover server 212, a backup server 214, a non-transitory computer readable medium 216, quantum mail 218, and quantum manager 220. The quantum system 201 may include a Quantum Entropy source as a Service server. The quantum system 201 may communicate with one or more mobile devices 250 or other user devices. The mobile device may include one or more of the following: a quantum voice app 252, a quantum voice manager app 254, a file sharing app 256, a mail app 256 and virtual private network (VPN) 260. The mobile device 250 may be connect to the quantum system 201 over an HTTPS encrypted connection.

In some example implementations, multiple QRNGs may be used for generation of random number bit sequences and may be used in multiple servers for providing random number generation services to multiple users/clients including but not limited to the mobile and other devices described above. One of such example implementations is shown as 300 in FIG. 3.

Figure 3:
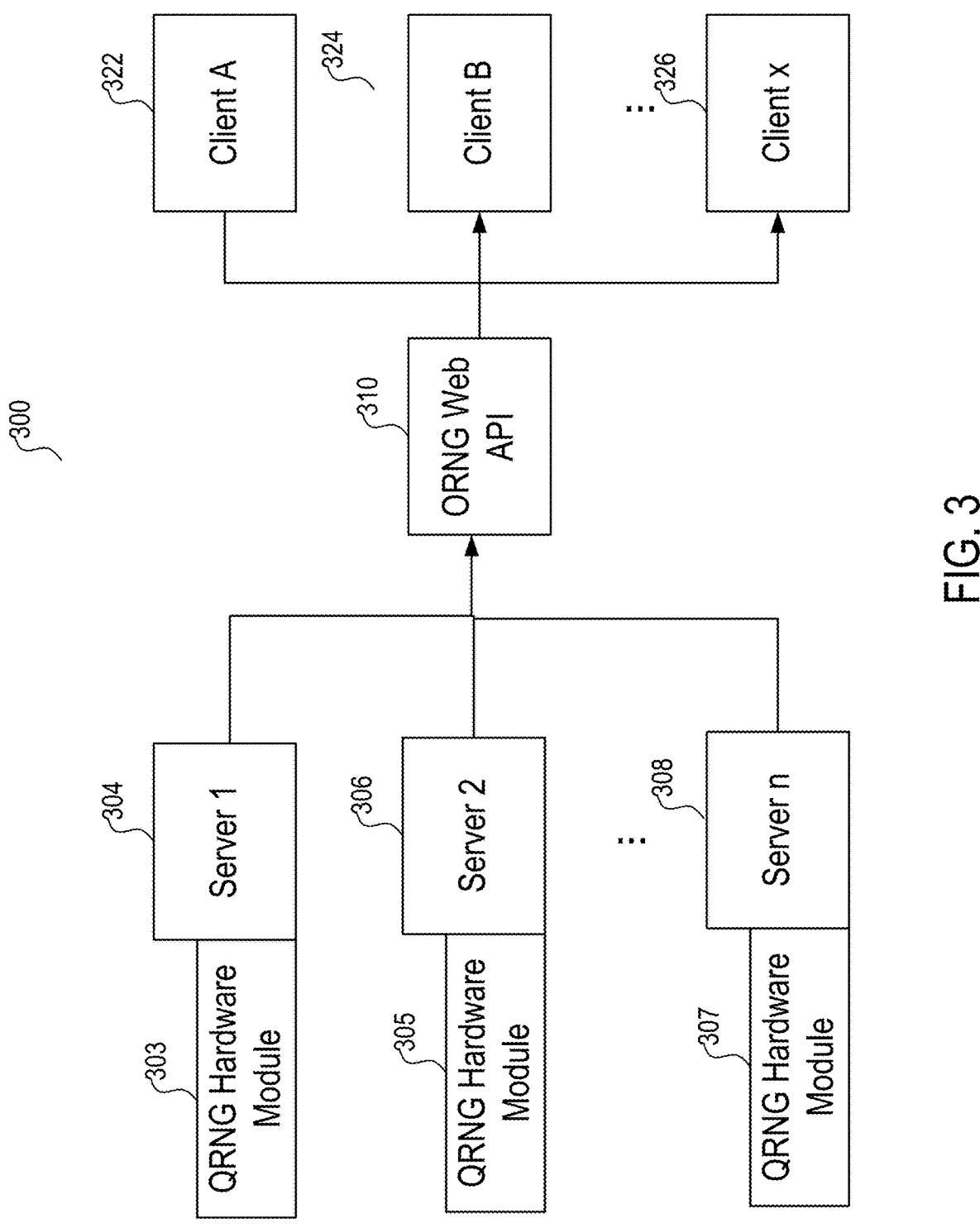
FIG. 3 illustrates a high-level redundant quantum random number generation and delivery system.

FIG. 3 particularly describes at a high level the implementation 300 of multiple independent QRNG devices spread across multiple processing servers to deliver a QRNG bitstream via an Application Program Interface (API) to the multiple devices or clients. As described in further detail below, these multiple independent quantum random number generators may be combined for various purposes, including but not limited to improvement of entropy and/or bitrate of the random numbers provided to the various devices and clients. In addition, these multiple random number generators may be used for redundancy purposes (e.g., other generators are still available to provide the required random number generation service while some generators are down and/or offline). While the depiction in FIG. 3 shows three independent servers, the example implementation is not limited so and can be scaled to any number of quantum random number generators required to achieve the QRNG bitrate, entropy quality level, or redundancy requirements.

Specifically, FIG. 3 shows that the example implementation 300 includes servers 304, 306, and 308 for providing random number generation services. The servers 304, 306, and 308 are configured or attached with QRNG hardware modules 303, 305, and 307, respectively. The QRNG hardware modules 303, 305, and 307 may be configured for the generation of random bit sequences. For example, each of the QRNG hardware modules 303, 305, and 307 may be based on the optical system described in FIG. 1. Each of these QRNG hardware modules 303, 305, and 307 may additionally be configured to operate independently such that the generation of random bit sequences among them are also random.

The random bit sequence generated by the QRNG hardware modules 303, 305, and 307 may then be provided to the various devices or clients, referred to as 322, 324, and 326, via an application program interface. Merely as an example, such an interface may be provided as a Web interface, referred to as QRNG Web API 310 in FIG. 3. As such, each of the user devices or clients 322, 324, and 326 may independently request random numbers on demand via the QRNG Web API 310 for their communication need. A request may indicate at least one of required bitrate and or required minimum entropy level.

Each of the devices or clients 322, 324, and 326 may be any device or system that can utilize a quantum random bitstream. For example, the device or client 322 or 324 or 326 may be an embodiment of the quantum random number generator 202 of the communication system 200 of FIG. 2. In other words, the quantum random number generator 102 of FIG. 1 may be replaced by the client device 322 or 324 or 326 of FIG. 3 which request quantum random number bitstream from the servers 304, 306 and 308 via the QRNG web API 310, rather than generating the random bit sequence by itself, and use the quantum random bitstream in application/service provided by the rest of the components in FIG. 1.

The independently generated quantum random bitstreams may be used and combined in any manner and may be provided to each of the devices/clients 322 or 324 or 326 via the QRNG Web API 310 according to the API requests in any manner of combination. For example, a particular bitrate may be requested. The various servers of FIG. 3 may accordingly aggregate the random bit sequences generated by multiple QRNG hardware modules 303, 305, and 307 to satisfy the bitrate requirement when, for example, a single one of the QRNG hardware modules 303, 305, and 307 cannot provide sufficient bitrate support. A number of QRNG hardware modules that may be involved in this situation may depend on the requested bitrate.

In some other examples, a specific entropy level may be requested. As such, the servers of FIG. 3 may accordingly combine the random bit sequences generated by multiple QRNG hardware modules 303, 305, and 307 to satisfy the entropy requirement according to the required entropy level and the supported entropy level of each of the QRNG hardware modules 303, 305, and 307.

The combination or aggregation of the bits generated from two or more of the independent QRNG hardware modules 303, 305, and 307 may be performed in various example manners. For example, the bits generated by the individual QRNG hardware modules may be interleaved with various predetermined or dynamically determined intervals and interleaving patterns.

Figure 4:
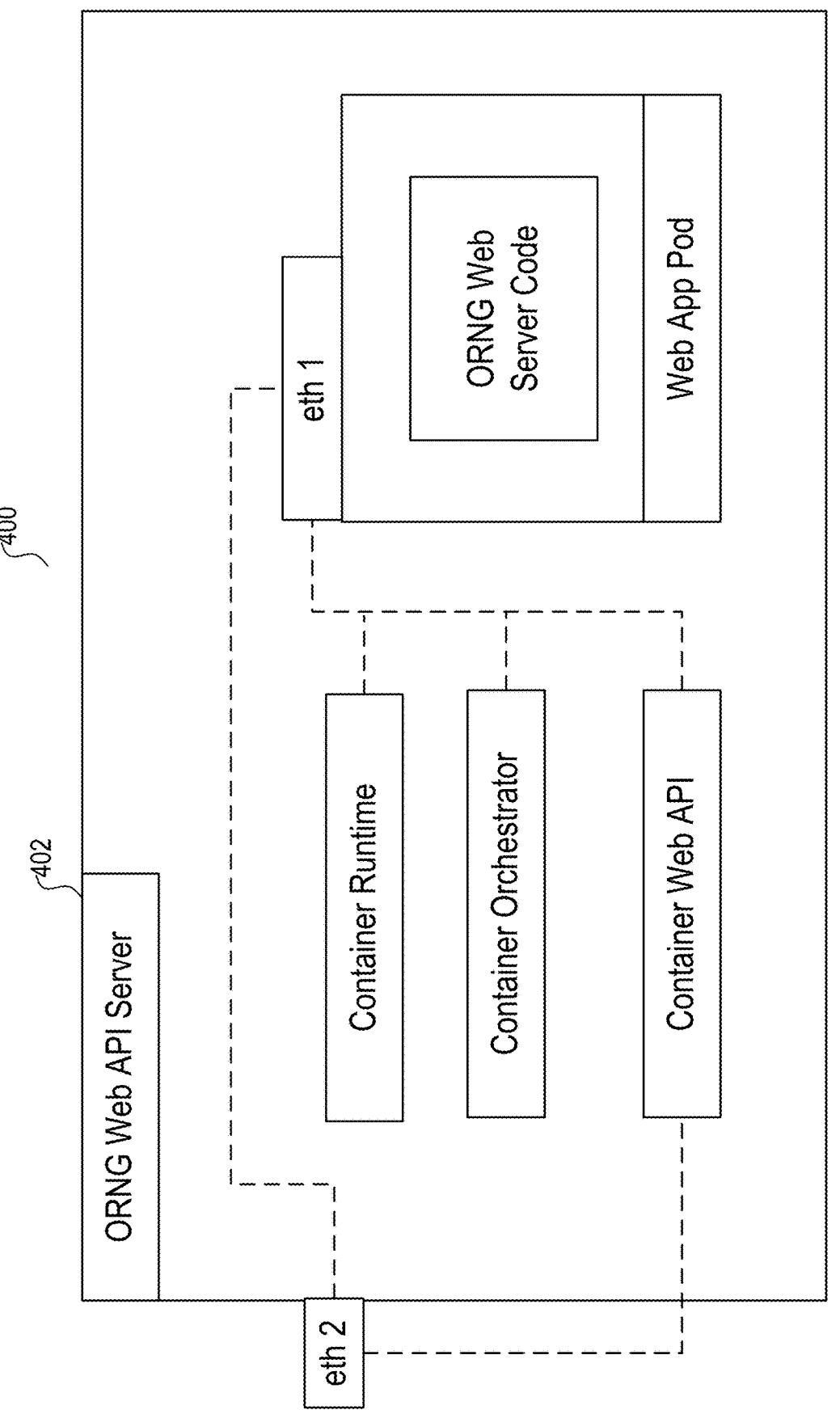
FIG. 4 illustrates an example Web application program interface server for redundant quantum random number generation.

Turning specifically to the QRNG Web API interface 310, a particular example implementation 400 is illustrated in FIG. 4. In the example of FIG. 4, the QRNG Web API may be implemented as an QRNG Web API server 402. The QRNG Web API server 402, for example, may be achieved using stateless containerization. Specifically, the sever 402 may be configured to minimize risk associated with storing entropy date (the random bits from the various QRNG hardware modules of FIG. 3), as such storage may be later inadvertently exploited to attack payloads encrypted based on these random bits. As an example, these the QRNG web API server 402 may include a container 404 for runtime functions, a container 406 for orchestration, a container 408 for Web API. These containers, for example, can be quickly reprovisioned to update components for bugfixes or security updates/patching.

The example QRNG web API server of FIG. 4 is illustrated as including a single. QRNG Web API server. However, such an implementation is not so limited and can be scaled to as many API endpoints as needed to meet, for example, geographic diversity or throughput requirements.

In some example applications above, the multiple QRNG hardware modules may be provided for achieving a particular system redundancy. Separate from being combined to generate a random bitrate or entropy levels as requested, such redundancy would facilitate continued operation of the system in the event that one or more of the QRNG hardware modules are offline, or are in need of repair/maintenance.

Accordingly, in some example implementations, the system described above may be configured to provide the random number generation services in various predefined mode. In a first mode, for example, the example system may be configured to provide random bitstream in a bitrate mode. For another example, the system may be configured to provide an entropy mode for providing random bit sequences above a particular requested entropy level threshold (by summing the entropies from different independent QRNG hardware nodules). For yet another example, the system may be configured to support some amount of redundancy, where a minimum guaranteed random bitstream rate is maintained equal to the redundancy value chosen by the operator based upon the quantity of QRNG devices within the system. These operation modes may be predefined and may be selectively requested.

In some other example implementations, the multiple QRNGs above in FIG. 4, for example, may be based on at least two different types of entropy sources. For example, an entropy source type based on single photon transmission/reflection at a semitransparent optical component such as the entropy resource of FIG. 1 may be used, and another type of entropy source may be also used for at least another QRNG. In such a matter, independency or randomness between the QRNGs may be further enhanced.

The above example implementations thus provide manners in which quantum random bit sequence may be provided as a service in a centralized fashion. The servers and various components above may also be distributed. Correspondingly, the above example implementations further provide manners in which quantum random bit sequence may be provided as a service in a distributed fashion where different elements are spread across several interconnected computer systems. Any type of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

The invention claimed is:

1. A quantum communication system comprising:

a plurality of photonic quantum random number generators (QRNGs), configured to generate quantum random bitstreams; and a server comprising a memory for storing instructions and a processor configured to execute the instructions to cause the server to function as an endpoint to aggregate the plurality of QRNGs to provide a quantum random number generation service to a plurality of devices for encryption keys, wherein the processor is configured to execute the instructions to generate an application programing interface (API) for the plurality of devices to request the quantum random number generation service.

2. The quantum communication system of claim 1, the plurality of QRNGs are configured to independently generate streams of quantum random bits.

3. The quantum communication system of claim 2, wherein each of the quantum random bitstreams of each of the plurality of QRNGs is used for generating one or more encryption keys for a communication session.

4. The quantum communication system of claim 1, wherein the server is configured to combine the quantum random bitstreams each from the plurality of quantum random number generators to generate an encryption key.

5. The quantum communication system of claim 4, wherein the quantum random bitstreams of the plurality of quantum random number generators are combined to achieve a bitrate requirement.

6. The quantum communication system of claim 4, wherein the quantum random bitstreams of the plurality of quantum random number generators are combined to achieve an entropy requirement.

7. The quantum communication system of claim 4, wherein the quantum random bitstreams are interleaved to form the combined quantum random bitstream.

8. The quantum communication system of claim 1, wherein a minimum quantum random bitstream rate is maintained at a predefined redundancy value based on quality of the plurality of QRNGs.

9. The quantum communication system of claim 1, wherein the plurality of QRNGs are centralized.

10. The quantum communication system of claim 1, wherein the plurality of QRNGs are geographically distributed.

11. The quantum communication system of claim 1, wherein the server is configured to provide the quantum random number generation service in at least two predefined modes.

12. The quantum communication system of claim 1, wherein at least one of the plurality of QRNGs is based on random transmittance or reflectance of single photons at a semitransparent optical component.

13. The quantum communication system of claim 1, wherein at least two of the plurality of the plurality of QRNGs are based on distinct types of entropy sources.

14. A quantum communication method, performed by a server, comprising:

receiving a request from a device via an API interface for a quantum random number generation service;

aggregating quantum random bitstreams from a subset of a plurality of quantum random number generators (QRNGs) in response to the request to generate an aggregated quantum random bitstream for encryption keys; and transmitting the aggregated quantum random bitstream to the device.

15. The quantum communication method of claim 14, wherein the plurality of QRNGs are configured to independently generate streams of quantum random bits.

16. The quantum communication method of claim 14, wherein the quantum random bitstreams of each of the plurality of QRNGs is used for generating one or more encryption keys for a communication session.

17. The quantum communication method of claim 14, wherein the server is configured to combine the quantum random bitstreams each from the plurality of quantum random number generators to generate an encryption key to achieve a bitrate requirement or an entropy level requirement.

18. The quantum communication method of claim 14, further comprising providing the quantum random number generation service in at least two predefined modes.

19. The quantum communication method of claim 14, wherein at least one of the plurality of QRNGs is based on random transmittance or reflectance of single photons at a semitransparent optical component.

20. The quantum communication method of claim 14, wherein at least two of the plurality of the plurality of QRNGs are based on distinct types of entropy sources.

\* \* \* \* \*